United States Patent
Yamada et al.

(10) Patent No.: US 7,144,607 B2
(45) Date of Patent: Dec. 5, 2006

(54) LIQUID CRYSTAL ORIENTATION AGENTS AND LIQUID CRYSTAL DISPLAY DEVICE WITH THE USE THEREOF

(75) Inventors: Tomohisa Yamada, Funabashi (JP); Hiroyoshi Fukuro, Funabashi (JP); Hideyuki Endo, Funabashi (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 0 days.

(21) Appl. No.: 10/479,972

(22) PCT Filed: Jun. 11, 2002

(86) PCT No.: PCT/JP02/05798

§ 371 (c)(1),
(2), (4) Date: Dec. 12, 2003

(87) PCT Pub. No.: WO02/100949

PCT Pub. Date: Dec. 19, 2002

(65) Prior Publication Data

US 2004/0167314 A1    Aug. 26, 2004

(30) Foreign Application Priority Data

Jun. 12, 2001  (JP)  ............................ 2001-176630

(51) Int. Cl.
 *C09K 19/56* (2006.01)
(52) U.S. Cl. ............... 428/1.2; 428/1.25; 428/1.26; 528/54; 528/353; 430/58.3; 430/58.8; 430/59.6
(58) Field of Classification Search ............... 428/1.2, 428/1.25–1.26; 528/54, 353; 430/58.3–58.8, 430/59, 59.6
See application file for complete search history.

(56) References Cited

U.S. PATENT DOCUMENTS

| | | | | |
|---|---|---|---|---|
| 3,990,984 A | | 11/1976 | Barret et al. ............... 252/299 |
| 4,562,132 A | * | 12/1985 | Ong et al. ............... 430/58.25 |
| 5,811,834 A | * | 9/1998 | Tamano et al. ............... 257/40 |
| 5,817,739 A | * | 10/1998 | Nukada et al. ............... 528/292 |
| 5,952,140 A | * | 9/1999 | Visser et al. ............... 430/58.5 |
| 6,027,848 A | * | 2/2000 | Pai et al. ............... 430/125 |
| 6,068,960 A | * | 5/2000 | Pai et al. ............... 430/132 |
| 6,127,077 A | * | 10/2000 | Pai et al. ............... 430/58.7 |
| 6,183,921 B1 | * | 2/2001 | Yu et al. ............... 430/58.7 |
| 6,194,111 B1 | * | 2/2001 | Fuller et al. ............... 430/59.6 |
| 6,200,655 B1 | * | 3/2001 | Gibbons et al. ............... 428/1.2 |
| 6,410,196 B1 | * | 6/2002 | Carmichael et al. ............... 430/59.6 |
| 6,649,283 B1 | * | 11/2003 | Lupo et al. ............... 428/690 |
| 6,861,188 B1 | * | 3/2005 | Ikegami et al. ............... 430/58.65 |

FOREIGN PATENT DOCUMENTS

| | | |
|---|---|---|
| CN | 1124515 | 1/2001 |
| JP | 62-280288 | 12/1987 |
| JP | 6-338392 | 12/1994 |
| JP | 9-298089 | 11/1997 |
| JP | 9298089 | * 11/1997 |
| WO | 99/28783 | 6/1999 |

OTHER PUBLICATIONS

Meisel et al., "Influence of the dopant concentration on the morphology of hole-transporting alignment layers based on a polyimide matrix", Polymer 43 (May 27, 2002) pp. 5235-5242.*
English translation of JP0-298089-A, Thompson Corporation.*
U.S. Appl. No. 10/494,511, filed May 13, 2004, Ono et al.
U.S. Appl. No. 10/479,972, filed Dec. 12, 2003, Yamada et al.
Patent Abstracts of Japan, JP 11-264984, Sep. 28, 1999.
Patent Abstracts of Japan, JP 2001-075101, Mar. 23, 2001.
Chinese Office Action with English Translation dated Jun. 24, 2005.

* cited by examiner

*Primary Examiner*—William P. Watkins, III
*Assistant Examiner*—Sow-Fun Hon
(74) *Attorney, Agent, or Firm*—Oblon, Spivak, McClelland, Maier & Neustadt, P.C.

(57) ABSTRACT

A polyimide-containing liquid crystal alignment treating agent having a structure of the formula (I) incorporated therein,

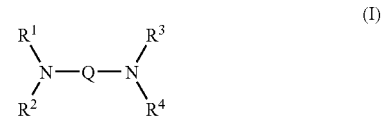

wherein Q is a single bond or a divalent organic group, $R^1$ to $R^4$ represent aromatic groups, and $R^1$ to $R^4$ may be the same as, or different from, one another.

7 Claims, No Drawings

LIQUID CRYSTAL ORIENTATION AGENTS AND LIQUID CRYSTAL DISPLAY DEVICE WITH THE USE THEREOF

This application is a 371 of PCT/JP02,05798, filed Jun. 11, 2002.

TECHNICAL FIELD

The present invention relates to a treating agent for liquid crystal alignment, which gives a liquid crystal alignment film excellent in electrical properties and reliability in the field of use for a liquid crystal device, and a liquid crystal display device employing the treating agent for liquid crystal alignment.

BACKGROUND ART

As a liquid crystal display device, display devices using a nematic liquid crystal are prevailing as a mainstream. Display devices according to various methods are in practical use at present, such as a twisted nematic (TN) device having a twist angle of 90°, a super twisted nematic (STN) device having a twist angle of 180° or more, a so-called TFT liquid crystal device using a thin film transistor, a lateral electric field type liquid crystal display device improved in visual angle properties, a vertical alignment type liquid crystal display device, and the like.

As an alignment film for these display devices, industrially, it is general practice to use a film formed by applying a solution of a polyimide precursor, a solvent-soluble polyimide or a mixture of these to form a coating, baking the coating and either carrying out alignment treatment such as rubbing or carrying out no special alignment treatment after the baking.

Properties required for the above liquid crystal alignment film naturally include basic properties such as transparency, heat resistance and chemical resistance, and they also include interfacial properties with a liquid crystal such as a good liquid crystal alignment property and a liquid crystal tilt angle having a stable and proper degree and electric properties such as a voltage retention ratio and a charge accumulation amount when a liquid crystal display device is driven.

Further, from viewpoints of production of a liquid crystal display device, storage stability of a treating agent for liquid crystal alignment, properties of a varnish such as a printing property of the treating agent on a substrate, and properties such as durability against scratches or scraping in the treatment of rubbing a coating film and liability to occurrence and release of electrostatic charges are also important.

Of the above properties, the electrical properties such as the voltage retention ratio and the charge accumulation amount are particularly important for a liquid crystal cell employing an active matrix driving method, such as TFT, and a variety of methods have been proposed. For example, taking it into account that an ether bond in a polyimide structure deteriorates the electrical properties, JP-A-6-228061 proposes a diamino compound having a specific structure free of an ether bond as a raw material for a polyimide. Further, JP-A-8-76128 proposes a method in which a compound having one carboxylic acid anhydride group or tertiary amine group is added to a polyimide-containing polymer.

DISCLOSURE OF THE INVENTION

It is an object of the present invention to provide a novel method for improving the voltage retention ratio or causing almost no decrease in the ratio and decreasing the accumulation charges in a polyimide-containing liquid crystal alignment film for use in various display devices employing a nematic liquid crystal.

The present inventors have made diligent studies on measures to overcome the above problems, and as a result, it has been found that a liquid crystal alignment film is improved in such electrical properties as the property of accumulation charge and the property of voltage retention by incorporating a specific structure into a composition (to be referred to as "polyimide-containing liquid crystal alignment treating agent" in the present invention) to be used for forming a liquid crystal alignment film containing a polyimide or a polyimide precursor as a main component (to be referred to as "polyimide-containing liquid crystal alignment film" in the present invention).

That is, the liquid crystal alignment treating agent of the present invention is a polyimide-containing liquid crystal alignment treating agent containing a structure of the following formula (I), and the liquid crystal display device of the present invention is a liquid crystal display device having a liquid crystal alignment film formed from the above liquid crystal alignment treating agent.

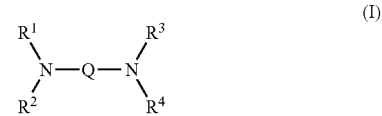

In the above formula Q is a single bond or a divalent organic group, $R^1$ to $R^4$ represent aromatic groups, and $R^1$ to $R^4$ may be the same as, or different from, one another.

The present invention will be explained in detail hereinafter.

The polyimide-containing liquid crystal alignment treating agent of the present invention has a characteristic feature in that it contains the structure of the formula (I), and a form of incorporation thereof is not specially limited. Preferred embodiments of the polyimide-containing liquid crystal alignment treating agent containing the structure of the formula (I), provided by the present invention, include a liquid crystal alignment treating agent containing at least one polymer selected from a polyamic acid and a polyimide and further containing a compound and/or a polymer having the structure of the formula (I), and a liquid crystal alignment treating agent containing at least one polymer selected from a polyamic acid and a polyimide having the structure of the formula (I).

Further, specific examples of the liquid crystal alignment treating agent of the present invention preferably include ① a mixture prepared by mixing a compound having the structure of the formula (I) (to be referred to as "compound [a]" hereinafter) with a solution containing at least one polymer selected from a polyamic acid and a polyimide, ② a mixture prepared by mixing a polymer having the structure of the formula (I) (to be referred to as "polymer [b]") with a solution containing at least one polymer selected from a polyamic acid and a polyimide and ③ a solution containing at least one polymer (to be referred to as "polymer [c]" hereinafter) selected from a polyamic acid or polyimide into which the structure of the formula (I) is directly incorporated. As a liquid crystal alignment treating agent of the present invention, naturally, it is preferred to use the above ① to ③ in combination. Among them, ③ is particularly preferred since the structure of the formula (I) is reliably incorporated into a liquid crystal alignment film, so that problems such as compatibility and aggregation of components involved in a mixture can be avoided.

In the structure of the above formula (I) to be incorporated into the liquid crystal alignment treating agent of the present invention, Q is a single bond or a divalent organic group. The divalent organic group is not specially limited, and specific examples thereof include a methylene group, an ethylene group, a propylene group, —Ph—O—Ph—, —Ph—CH$_2$—Ph—, —CH$_2$—Ph—CH$_2$— and an aromatic ring. The aromatic ring includes a phenyl group, a biphenyl group, a terphenyl group, a naphthyl group, a phenanthrene group, a pyrene group, a perylene group, an anthracene group and a fluorene group.

The above divalent organic group may have a substituent or may be free of a substituent. The above substituent includes an alkyl group having 1 to 20 carbon atoms, an alkoxyl group having 1 to 20 carbon atoms, bromine, iodine, fluorine, chlorine and a trifluoromethyl group. Q is preferably a phenyl group, a biphenyl group, a terphenyl group, a naphthyl group, —CH$_2$—Ph—CH$_2$—, a fluorene group, a methylene group, an ethylene group or a propylene group.

In the formula (I), each of $R^1$ to $R^4$ is an aromatic group. Although not specially limited, specific examples thereof include a phenyl group, a biphenyl group, a terphenyl group, a naphthyl group, a phenanthrene group, a pyrene group, a perylene group, an anthracene group and a fluorene group. The aromatic group preferably includes a phenyl group, a biphenyl group, a terphenyl group, a naphthyl group and a fluorene group. These may have a substituent or may be free of a substituent. The substituent includes an alkyl group having 1 to 20 carbon atoms, an alkoxyl group having 1 to 20 carbon atoms, an amino group, a hydroxyl group, bromine, iodine, fluorine, chlorine and a trifluoromethyl group.

The polyamic acid for use in the above embodiments ① and ② is a polyamic acid generally used for a liquid crystal alignment film. Although not specially limited, generally, it can be obtained by reacting tetracarboxylic acid dianhydride with a diamine compound in an organic solvent.

The tetracarboxylic acid dianhydride for use in the synthesis reaction for the polyamic acid includes dianhydrides of aromatic tetracarboxylic acids such as pyromellitic acid, 2,3,6,7-naphthalenetetracarboxylic acid, 1,2,5,6-naphthalenetetracarboxylic acid, 1,4,5,8-naphthalenetetracarboxylic acid, 2,3,6,7-anthracenetetracarboxylic acid, 1,2,5,6-anthracenetetracarboxylic acid, 3,3',4,4'-biphenyltetracarboxylic acid, 2,3,3',4-biphenyltetracarboxylic acid, bis(3,4-dicarboxyphenyl)ether, 3,3',4,4'-benzophenonetetracarboxylic acid, bis(3,4-dicarboxyphenyl)sulfone, bis(3,4-dicarboxyphenyl)methane, 2,2-bis(3,4-dicarboxyphenyl)propane, 1,1,1,3,3,3-hexafluoro-2,2-bis(3,4-dicarboxyphenyl)propane, bis(3,4-dicarboxyphenyl)dimethylsilane, bis(3,4-dicarboxyphenyl)diphenylsilane, 2,3,4,5-pyridinetetracarboxylic acid and 2,6-bis(3,4-dicarboxyphenyl)pyridine, dianhydrides of alicyclic tetracarboxylic acids such as 1,2,3,4-cyclobutanetetracarboxylic acid, 1,2,3,4-cyclopentanetetracarboxylic acid, 1,2,4,5-cyclohexanetetracarboxylic acid, 2,3,5-tricarboxylcyclopentylacetic acid and 3,4-dicarboxy-1,2,3,4-tetrahydro-1-naphthalenesuccinic acid, and dianhydrides of aliphatic tetracarboxylic acids such as 1,2,3,4-butanetetracarboxylic acid. Concerning these acid dianhydrides, a single compound may be used, or a plurality of compounds may be used in combination.

The diamine compound for use in the synthesis reaction for the polyamic acid includes aromatic diamines such as p-phenylenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminodiphenylmethane, diaminodiphenylether, 2,2'-diaminodiphenylpropane, bis(3,5-diethyl-4-aminophenyl)methane, diaminodiphenylsulfone, diaminobenzophenone, diaminonaphthalene, 1,4-bis(4-aminophenoxy)benzene, 1,4-bis(4-aminophenyl)benzene, 9,10-bis(4-aminophenyl)anthracene, 1,3-bis(4-aminophenoxy)benzene, 4,4'-(4-aminophenoxy)diphenylsulfone, 2,2-bis[4-(4-aminophenoxy)phenyl]propane, 2,2-bis(4-aminophenyl)hexafluoropropane and 2,2-bis[4-(4-aminophenoxy)phenyl]hexafluoropropane, alicyclic diamines such as bis(4-aminocyclohexyl)methane and bis(4-amino-3-methylcyclohexyl)methane, aliphatic diamines such as 1,2-diaminoethane, 1,3-diaminopropane, 1,4-diaminobutane and 1,6-diaminohexane, and silicon diamines such as 1,3-bis(3-aminopropyl)-1,1,3,3-tetramethyldisiloxane. Concerning these diamines, a single compound may be used, or a plurality of compounds may be used in combination.

For increasing a liquid crystal tilt angle, further, any one of diamines having the following structures may be used in combination with the above diamine.

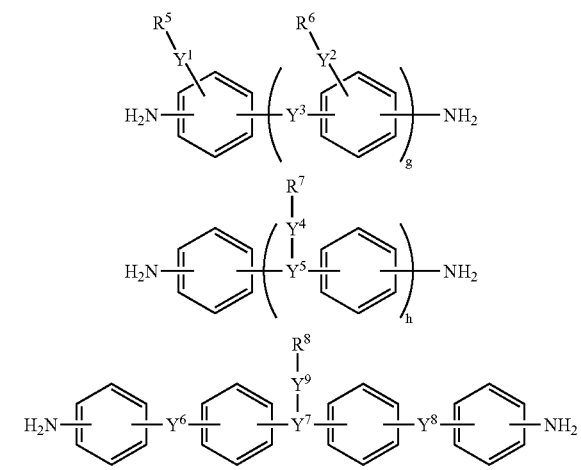

In the above formula, each of $R^5$, $R^6$, $R^7$ and $R^8$ is independently a substituent having 6 or more carbon atoms, each of $Y^1$, $Y^2$, $Y^4$, $Y^6$, $Y^8$ and $Y^9$ is independently a single bond, an ether bond, an ester bond or an amide bond, $Y^3$ is a single bond, a linear alkyl group having 1 to 5 carbon atoms or a branched alkyl group having 1 to 5 carbon atoms, each of $Y^5$ and $Y^7$ is carbon or nitrogen, g is an integer of 0 to 3 and h is an integer of 1 to 3.

The degree of the liquid crystal tilt angle changes depending upon the size and amount of side chain(s) of the above diamine having the side chain(s). When the side chain has less than 6 carbon atoms, the effect of incorporation thereof may not be expected. When the content of the diamine is less than 5 mol %, the effect produced by the incorporation is low even if the side chain has 6 or more carbon atoms.

With regard to the amount ratio of the tetracarboxylic acid dianhydride and the diamine compound for use in the synthesis reaction for the polyamic acid, the molar ratio of the diamine compound to the mole amount of the tetracarboxylic acid dianhydride is preferably from 0.8 to 1.2. Like general polycondensation, the polymerization degree of the thus-formed polymer increases as the above molar ratio comes closer to 1.0.

When the polymerization degree is too small, the strength of a coating film obtained therefrom is insufficient. When the polymerization degree is too large, workability during the formation of a coating film may be poor. Concerning the polymerization degree of a product formed in the above reaction, preferably, the product has a weight average molecular weight {Mw} of 2,000 to 500,000 measured by a GPC (Gel Permeation Chromatography) method.

The reaction for synthesis of the polyamic acid is carried out in an organic solvent generally at a reaction temperature of 0 to 150° C., preferably 0 to 100° C. The above organic solvent is not specially limited so long as it can dissolve a reaction product formed during the reaction. Specific examples of the above organic solvent include N,N-dimethylformamide, N,N-dimethylacetamide, N-methyl-2-pyrrolidone, N-methylcaprolactam, dimethyl sulfoxide, tetramethylurea, pyridine, dimethyl sulfone, hexamethyl sulfoxide and γ-butyrolactone. These may be used alone or in combination as a mixture. A solvent that does not dissolve a polyimide precursor may be used in combination with the above solvent so long as a polyimide precursor formed by the polymerization does not precipitate.

Preferably, the amount of the above organic solvent is determined so that the total amount of the tetracarboxylic acid dianhydride and the diamine compound is 0.1 to 30% by weight based on the total amount of a reaction solution.

The thus-obtained polyimide precursor may be used as it is, or it may be precipitated in a poor solvent such as methanol or ethanol and isolated to recover it and the recovered precursor may be re-dissolved in a proper solvent for use. While the solvent for the re-dissolving is not specially limited so long as it dissolves the polyimide precursor, specific examples thereof include aprotic polar solvents such as N-methyl-2-pyrrolidone, N,N-dimethylacetamide, N,N-dimethylformamide, dimethyl sulfoxide, γ-butyrolactone, tetramethylurea and hexamethylphosphoryltriamide, and phenolic solvents such as m-cresol, xylenol, phenol and halogenated phenol.

In the present invention, the polyimide for use in the above embodiments ① and ② is an organic solvent-soluble polyimide generally used as a liquid crystal alignment film but is not specially limited. The above polyimide includes a polymer in which not all of repeating units of the polyamic acid are imidated (ring-closed by dehydration), and such a polymer is suitably usable in the liquid crystal alignment treating agent of the present invention as well. The above polyimide can be generally obtained by a method in which a corresponding polyamic acid is heated in a solution or a catalyst is added to ring-close the polyamic acid by dehydration.

The reaction temperature in the method of heating the polyamic acid in a solution is generally 50 to 200° C., preferably 60 to 170° C. When the reaction temperature is lower than 50° C., the ring-closing reaction by dehydration does not fully proceed. When the reaction temperature exceeds 200° C., the thus-obtained imidation polymer may have a low molecular weight.

In the reaction in which a dehydration agent and a ring-closing catalyst are added to a solution of the polyamic acid for imidation, the dehydration agent can be selected, for example, from acid anhydrides such as acetic anhydride, propionic anhydride and trifluoroacetic acid anhydride. The amount of the dehydration agent per mole of the repeating unit of the polyamic acid is preferably 0.01 to 20 mol.

Further, the dehydration ring-closing catalyst can be selected from tertiary amines such as pyridine, triethylamine, and the like. The amount of the dehydration ring-closing catalyst per mole of the dehydration agent used is preferably 0.01 to 10 mol. The organic solvent for use in the dehydration ring-closing reaction includes those organic solvents described as examples with regard to the synthesis of the polyamic acid. The reaction temperature for the dehydration ring-closing reaction is generally 0 to 180° C., preferably 10 to 150° C.

In the above embodiments ① and ② in the present invention, a mixture of the above polyamic acid and polyimide may be used.

The compound [a] for use in the above embodiment ① is a tertiary diamine compound having the structure of the formula (I). Although not specially limited, specific examples thereof are as described below.

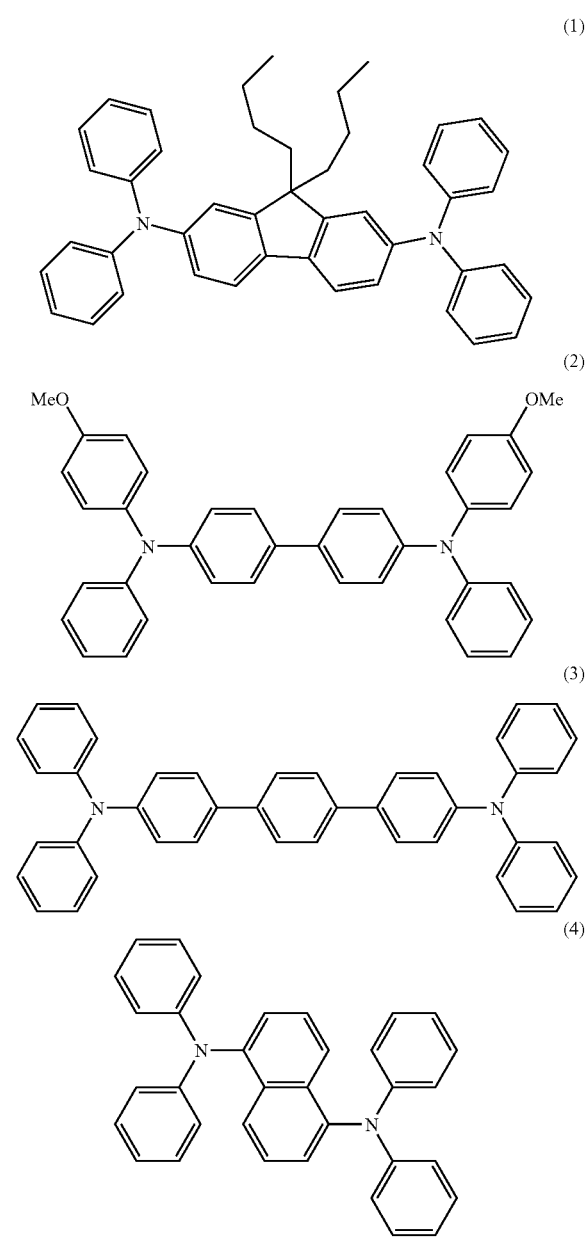

-continued (5) 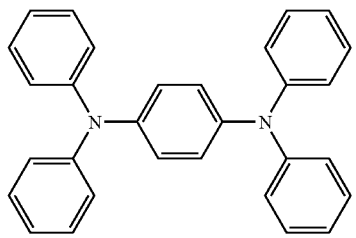

(6) 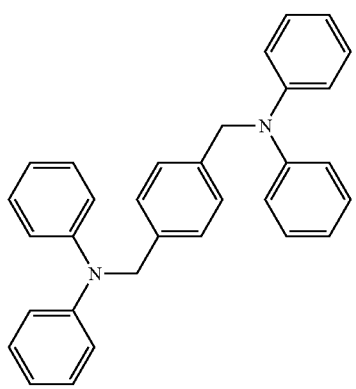

(7) 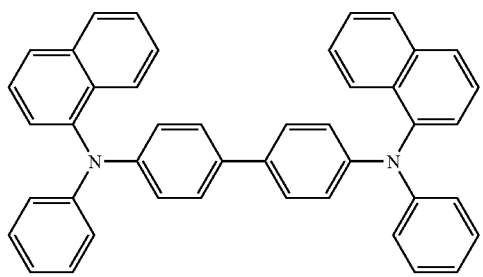

(8) 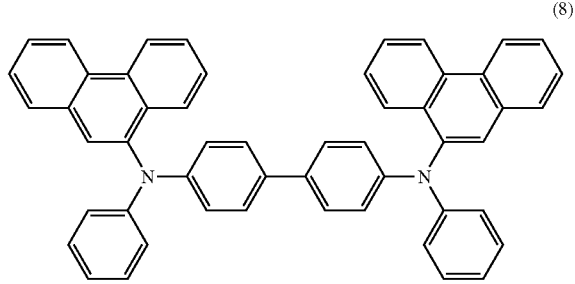

(9) 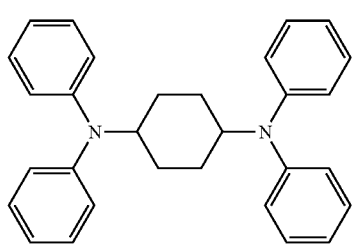

-continued

(10) 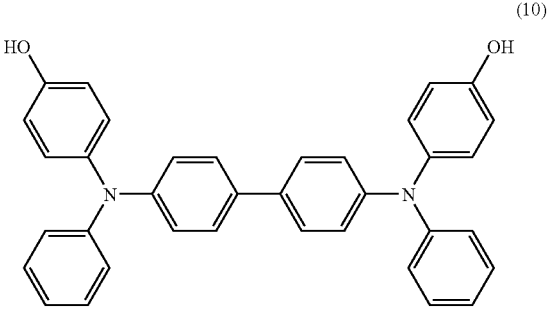

(11) 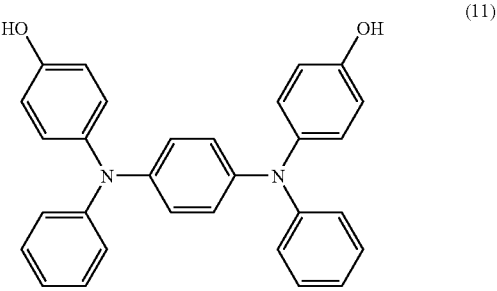

Of these, compounds (1) to (6), (10) and (11) are preferred.

Generally, the compound [a]can be obtained, for example, by a method in which a primary diamine represented by $H_2N—Q—NH_2$ or a secondary diamine represented by $R^2—NH—Q—NH—R$ and a halide represented by R—X are reacted in an organic solvent such as xylene, toluene or benzene in the presence of as palladium acetate, tert-butyl phosphine or a base in a nitrogen atmosphere at a reaction temperature in the range of 90 to 150° C. for 3 hours or more. The above Q is the same divalent organic group as that defined for Q in the general formula (I), R is the same aromatic group as those defined for $R^1$ to $R^4$ in the general formula (I) and X is a halogen such as Cl, Br, or the like.

In the above embodiment ① in the present invention, the amount of the compound [a], as a weight ratio thereof to the resin weight of at least one polymer selected from the polyamic acid and polyimide, is from 0.01 to 0.5, preferably from 0.1 to 0.3. When the amount of the compound [a] is too small, the effect on improvements in the voltage retention ratio and the charge accumulation property cannot be expected. When it is too large, the voltage retention ratio may be decreased.

The polymer [b] for use in the above embodiment ② in the present invention is not specially limited so as long it is a polymer having the structure of the formula (I). Specific examples thereof include a polyether, a polyester, a polyamide, a polyamic acid, a polyimide, a polyurethane and the like.

For obtaining the above polymers, generally, the following methods are employed. For the polyether, there is employed a method in which a hydroxyl group-substituted compound having the structure of the formula (I) and a halogen-substituted compound are reacted in the presence of an alkali; for the polyester, there is employed a method in which a carboxy group-substituted compound having the structure of the formula (I) and a polyhydric alcohol are subjected to a polycondensation reaction or a hydroxyl group-substituted compound having the structure of the formula (I) and a carboxy group-substituted compound are subjected to a polycondensation reaction; for the polyamide, there is employed a method in which a carboxy group-substituted compound having the structure of the formula (I) and a diamine derivative are subjected to a polycondensation reaction or an amino-substituted compound having the structure of the formula (I) and a carboxy group-substituted compound are subjected to a polycondensation reaction; for the polyamic acid, there is employed a method in which an amine group-substituted compound having the structure of the formula (I) and an acid dianhydride derivative are subjected to a polycondensation reaction; for the polyimide, there is employed a method in which the polyamic acid obtained already is treated under heat or in the presence of a dehydration ring-closing catalyst; and for the polyurethane, an isocyanic acid ester-substituted compound having the structure of the formula (I) and glycol are subjected to a polyaddition reaction.

The above hydroxyl group-substituted compound having the structure of the formula (I) can be synthesized according to a general organic synthesis method. Specifically, it is generally obtained by reacting a benzene derivative containing a hydroxyl group and a halogen with acetic anhydride and pyridine to protect the hydroxyl group, then reacting the resultant reaction product with a primary diamine of $H_2N$—Q—$NH_2$ or a secondary diamine of R—NH—Q—NH—R in the presence of an alkali, and then reacting the formed product in the presence of an acid to remove the protection of an acetyl group.

The above carboxyl group-substituted compound having the structure of the formula (I) can be synthesized according to a general organic synthesis method. Specifically, it is generally obtained by allowing a benzene derivative containing a carboxyl group and a halogen to react in the presence of methanol and an acid to protect the carboxyl group, then reacting the reaction product with a primary diamine of $H_2N$—Q—$NH_2$ or a secondary diamine of R—NH—Q—NH—R in the presence of an alkali, and then reacting the formed product in the presence of an acid to remove the protection of an acetyl group.

The above amino group-substituted compound having the structure of the formula (I) can be synthesized according to a general organic synthesis method. Specifically, it is generally obtained by allowing a benzene derivative containing an amino group and a halogen to react in the presence of acetic acid to protect the amino group, then reacting the reaction product with a primary diamine of $H_2N$—Q—$NH_2$ or a secondary diamine of R—NH—Q—NH—R in the presence of an alkali, and then reacting the formed product in the presence of an acid to remove the protection of an acetyl group.

The above isocyanic acid ester-substituted compound having the structure of the formula (I) can be synthesized according to a general organic synthesis method. Specifically, it is generally obtained by reacting an isocyanic acid ester group-containing halogen derivative with a primary diamine of $H_2N$—Q—$NH_2$ or a secondary diamine of R—NH—Q—NH—R in the presence of an alkali.

In the above embodiment ② in the present invention, the amount of the polymer [b], as a weight ratio thereof to the resin weight of at least one polymer selected from the polyamic acid and polyimide, is from 0.01 to 0.5, preferably from 0.1 to 0.3. When the amount of the polymer [b] is too small, the effect on improvements in the voltage retention ratio and the charge accumulation property cannot be expected. When it is too large, the voltage retention ratio may be decreased.

Concerning the polymer [c] for use in the above embodiment ③ in the present invention, a diamine compound having the structure of the formula (I) is used as a part of raw materials and copolymerized with a tetracarboxylic acid and other diamine compound, whereby a polymer [c] of a polyamic acid can be obtained, and the polyamic acid is imidized, whereby a polymer [c] of a polyimide can be obtained.

The tetracarboxylic acid dianhydride and the other diamine compound for use in the above copolymerization are those that are generally used for polymerization of a polyamic acid and a polyimide, and they are not specially limited. Specific examples thereof include such tetracarboxylic acid dianhydrides and diamine compounds as described with regard to the polyamic acid for use in the above embodiments ① and ②.

Further, the diamine compound having the structure of the formula (I) can be used like general diamine compounds, so that the method of obtaining the polyamic acid for use in the above embodiments ① and ② and the method of obtaining the polyimide can be directly applied.

For obtaining the diamine compound having the structure of the formula (I), there is employed a method in which a bisphenol compound having the structure of the formula (I) and an aromatic halogenated nitro compound are reacted in dimethylacetamide in the presence of a base at 120 to 140° C. to form a dinitro compound, and a nitro group is converted to an amino group by reduction with palladium-carbon and hydrogen.

The amount of the diamine compound having the structure of the formula (I), used for obtaining the polymer [c], is 0.01 to 0.5, preferably 0.05 to 0.3 when the total diamine compound amount is taken as 1. When the amount of the diamine compound is too small, the effect on improvements in the voltage retention ratio and the charge accumulation property cannot be expected. When it is too large, the voltage retention ratio may be decreased.

The solvent for use in the liquid crystal alignment treating agent of the present invention is not specially limited so long as it can dissolve the composition to be incorporated. Examples thereof include 2-pyrrolidone, N-methylpyrrolidone, N-ethylpyrrolidone, N-vinylpyrrolidone, N,N-dimethylacetamide, N,N-dimethylformamide and γ-butyrolactone.

A solvent that does not dissolve the composition when used alone may be used in combination with the above solvents so long as it does not impair the solubility of the composition. Examples of such a solvent include ethyl cellosolve, butyl cellosolve, ethyl carbitol, butyl carbitol, ethyl carbitol acetate, ethylene glycol, 1-methoxy-2-propanol, 1-ethoxy-2-propanol, 1-butoxy-2-propanol, 1-phenoxy-2-propanol, propylene glycol monoacetate, propylene glycol diacetate, propylene glycol-1-monomethyl ether-2-acetate, propylene glycol-1-monoethyl ether-2-acetate, dipropylene glycol, 2-(2-ethoxypropoxy)propanol, methyl lactate, ethyl lactate, n-propyl lactate, n-butyl lactate and isoamyl lactate.

Although the content of a solid in the thus-obtained liquid crystal alignment treating agent of the present invention is not specially limited if it is a homogeneous solution, it is generally 1 to 15% by weight, preferably 2 to 8% by weight.

For further improving adhesion between a polyimide resin film and a substrate, the liquid crystal alignment treating agent may contain an additive such as a coupling agent.

The liquid crystal alignment treating agent of the present invention is used in such a manner as that a uniform film is formed on a substrate therefrom and used as a liquid crystal alignment film after alignment treatment by rubbing or irradiation with light, or without the alignment treatment.

The liquid crystal display device of the present invention is a liquid crystal display device produced by applying the liquid crystal alignment treating agent of the present invention to a substrate having electrodes, carrying out treatments such as drying, baking and rubbing to form a liquid crystal alignment film and then preparing a liquid crystal cell by a known method.

As a base material for the substrate having electrodes, a transparent material such as glass or plastic can be used. For a reflection type liquid crystal display device, even a non-transparent material such as a silicon wafer can be used so long as it is used as a substrate on one side alone. For the electrodes as well, not only a transparent material such as ITO can be used, but also a light-reflecting material such as aluminum can be used if the electrodes are for a reflection type liquid crystal display device.

Although not specially limited, the method of applying the liquid crystal alignment treating agent of the present invention includes, for example, a roll coater method, a spinner method and a printing method. From a viewpoint of productivity, industrially, a transfer printing method is widely employed.

With regard to the drying after the alignment treating agent is applied, the drying method is not specially limited so long as the solvent is vaporized to such an extent as the shape of the coating does not change before the baking.

In the present invention, the baking of the liquid crystal alignment treating agent can be carried out at any temperature of 100 to 350° C., preferably at 150° C. to 300° C., more preferably at 200° C. to 250° C. When the liquid crystal alignment treating agent contains the polyamic acid, the conversion from the polyamic acid to the polyimide varies depending upon the above baking temperature. In the liquid crystal alignment treating agent of the present invention, 100% imidation of the polyamic acid is not necessarily required. However, the baking is preferably carried out at a temperature higher by at least 10° C. than the temperature of heat treatment required, for example, for curing a sealing agent in the process of fabricating a liquid crystal cell.

The above baking is followed by alignment treatment typified by rubbing as required, to form a liquid crystal alignment film.

The liquid crystal display device of the present invention is liquid crystal display device having a liquid crystal alignment film formed from the liquid crystal alignment treating agent of the present invention, and it can be applied to a TN device, an STN device and a TFT liquid crystal device, and further can be applied to display devices according to various methods using a nematic liquid crystal such as a lateral electric field type liquid crystal display device, a vertical alignment liquid crystal display device, and the like.

The present invention will be explained further in detail with reference to Examples below, while the present invention shall not be limited thereto.

SYNTHESIS EXAMPLE 1

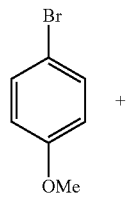

-continued

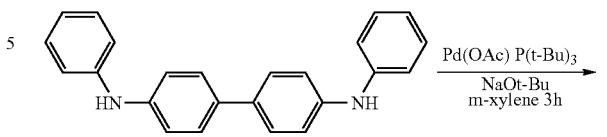

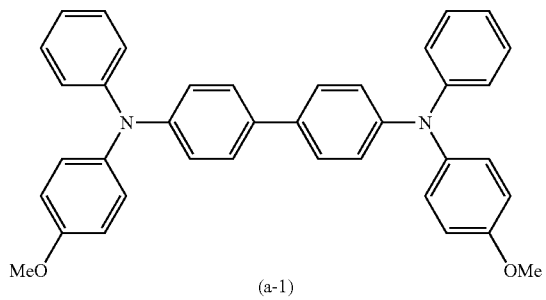

In a nitrogen atmosphere, a 500 ml four-necked flask was charged with 20 ml of m-xylene, 0.42 g {0.0018 mol} of palladium (II) acetate and 1.5 g {0.0075 mol} of tert-butyl phosphine, and the mixture was stirred for 10 minutes. Then, a solution of 35 g {0.187 mol} of 4-bromoanisole in 100 ml of m-xylene was dropwise added thereto, and the mixture was stirred further for 10 minutes.

Thereafter, a solution of 25 g {0.075 mol} of N,N'-diphenylbenzidine in 200 ml of m-xylene was added, then, 15.86 g {0.165 mol} of sodium-tert-butoxide was added, and the mixture was allowed to react at 110° C. for 3 hours. After completion of the reaction, water was dropwise added into the flask, followed by extraction with diethyl ether. An extract was dehydrated with sodium sulfate, then, sodium sulfate was separated by filtration, and the solvent was distilled off by an evaporator. A crude product was purified by a silica gel column chromatography method (chloroform: n-hexane=1:1), to give a compound (a-1).

SYNTHESIS EXAMPLE 2

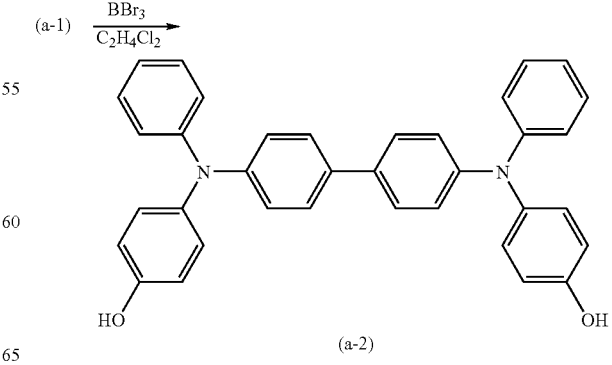

In a nitrogen atmosphere, a solution of 16 g {0.16 mol} of boron tribromide in 100 ml of dichloroethane was placed in a 500 ml four-necked flask and cooled to −75° C. 18 g (0.033 mol) of the compound (a-1) was dissolved in 50 ml of dichloroethane, and the solution was gradually added dropwise. Then, the mixture was allowed to cool and allowed to react for 8 hours. After completion of the reaction, water and diethyl ether were added, an oily layer was recovered and dehydrated with sodium sulfate, and the solvent was distilled off with an evaporator. A crude product was purified by silica gel column chromatography method (ethyl acetate:n-hexane=1:4), to give a compound (a-2),

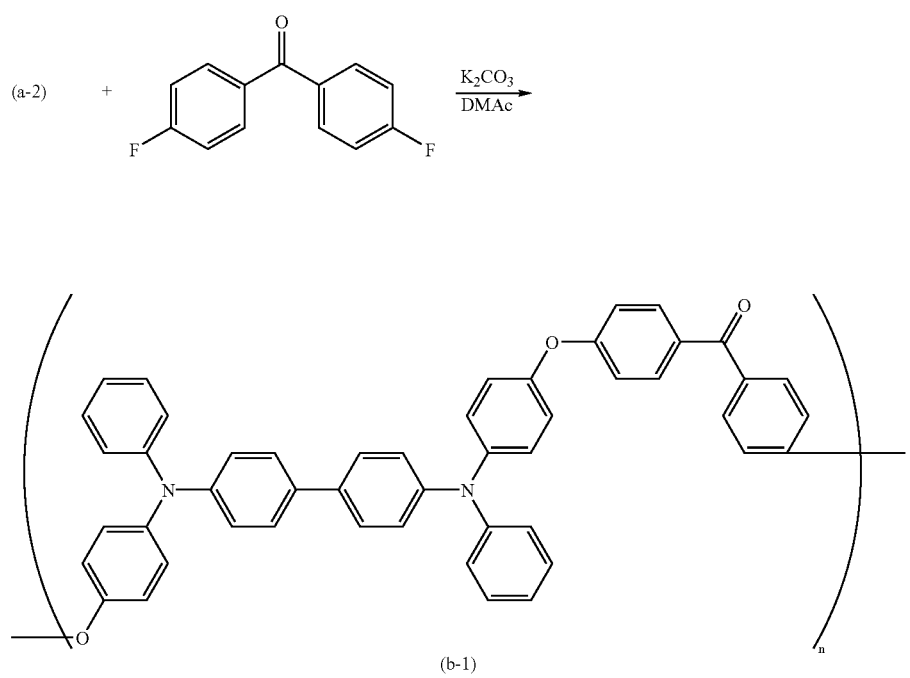

In a 200 ml eggplant type flask in a nitrogen atmosphere, 0.124 g {0.00057 mol} of the compound (a-2), 0.3 g {0.00057 mol} of 4-fluorobenzophenone and 0.13 g {0.001 mol} of potassium carbonate were reacted in 20 ml of dimethylacetamide (to be abbreviated as "DMAc" hereinafter) at 140° C. for 3 hours. The reaction product was purified three times by re-precipitation with acetone, to give a polymer (b-1). The polymer (b-1) was measured by a GPC method to show a number average molecular weight of {Mn=15000, Mw=30000}.

SYNTHESIS EXAMPLE 3

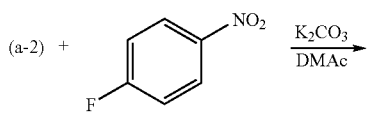

-continued

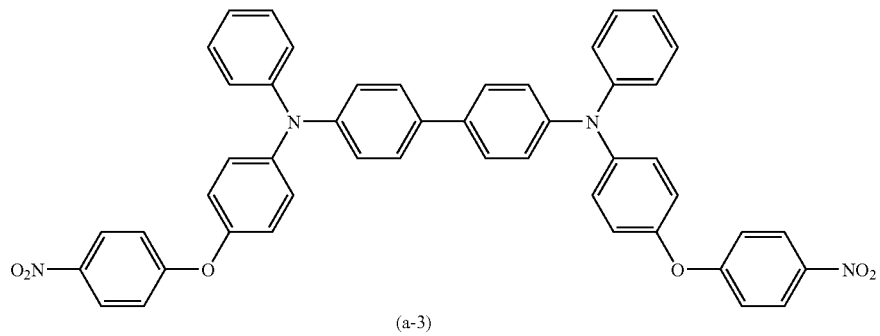

(a-3)

In a 200 ml four-necked flask in a nitrogen atmosphere, 5 g {0.01 mol} of the compound (a-2), 0.484 g {0.044 mol} of 4-fluoronitrobenzene and 12.16 g {0.088 mol} of potassium carbonate were reacted in 40 ml of DMAc at 140° C. for 3 hours, and then water and chloroform were added to extract an oily layer. The oily layer was dehydrated with sodium sulfate, the solvent was removed with an evaporator, and the residue was purified by a silica gel column chromatography method (chloroform:n-hexane=3:1), to give a compound (a-3).

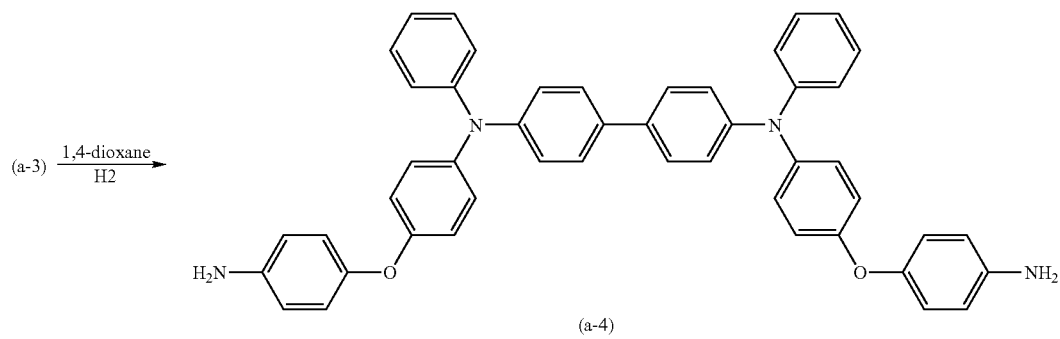

(a-4)

In a 200 ml four-necked flask, 6.5 g {0.0085 mol} of the compound (a-3) was dissolved in 40 ml of 1,4-dioxane, palladium-carbon (5% [Pd/C]) {0.00017 mol} was added to substitute hydrogen, and the mixture was allowed to react at 60° C. for 48 hours. After completion of the reaction, the palladium-carbon was filtrated off, and the solvent was distilled off. The residue was purified by a silica gel column chromatography method (chloroform:dioxane=20:1), to give a compound (a-4).

SYNTHESIS EXAMPLE 4

In a 500 ml four-necked flask under a nitrogen gas current, 5 g {0.025 mol} of 4,4'-diaminodiphenyl ether (to be abbreviated as "DDE" hereinafter) and 1.95 g (0.0028 mol) of the compound (a-4) were dissolved in 69.6 g of N-methyl-2-pyrrolidone (to be abbreviated as "NMP" hereinafter). Then, 5.33 g {0.0272 mol} of 1,2,3,4-cyclobutanetetracarboxylic acid dianhydride (to be abbreviated as "CBDA" hereinafter) was added, followed by polymerization for 5 hours, to give a solution of a polyamic acid (c-1). The polyamic acid (c-1) was measured by a GPC method to show a number average molecular weight and a weight average molecular weight of {MN=15000 and Mw=35000}.

SYNTHESIS EXAMPLE 5

In a 500 ml four-necked flask under a nitrogen gas current, 5.6 g {0.028 mol} of DDE was dissolved in 69.6 g of NMP, then, 5.33 g {0.0272 mol} of CBDA was added, and the mixture was polymerized for 5 hours, to give a solution of a polyamic acid (d). The polyamic acid (d) was measured by a GPC method to show a number average molecular weight and a weight average molecular weight of {MN=30000 and Mw=66000}.

SYNTHESIS EXAMPLE 6

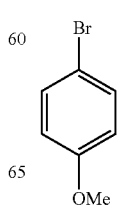

+

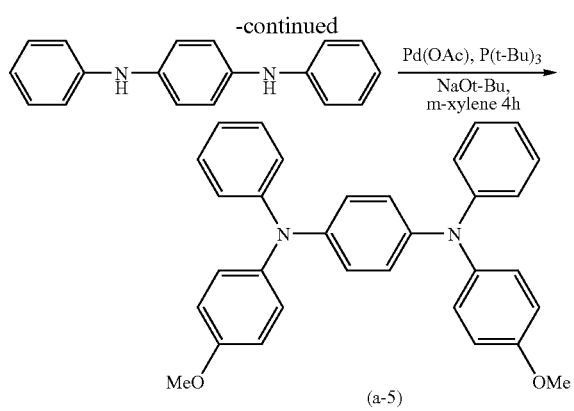

In a nitrogen atmosphere, a 500 ml four-necked flask was charged with 25 ml of m-xylene, 0.435 g {0.0019 mol} of palladium (II) acetate and 1.57 g (0.0078 mol) of tert-butyl phosphine, and the mixture was stirred for 10 minutes. A solution of 15.95 g {0.0853 mol} of 4-bromoanisole in 83 ml of m-xylene was added dropwise, and the mixture was stirred for 10 minutes. Then, a solution of 10.09 g {0.0388 mol} of N,N'-diphenyl-1,4-phenylenediamine in 150 ml of m-xylene was added, then, 11.17 g {0.1163 mol} of sodium-tert-butoxide was added, and the mixture was allowed to react at 110° C. for 4 hours. After completion of the reaction, the reaction solution was filtrated through a celite, and the solvent was distilled off from the filtrate with an evaporator. The resultant residue was recrystallized from diethyl ether, to give a compound (a-5).

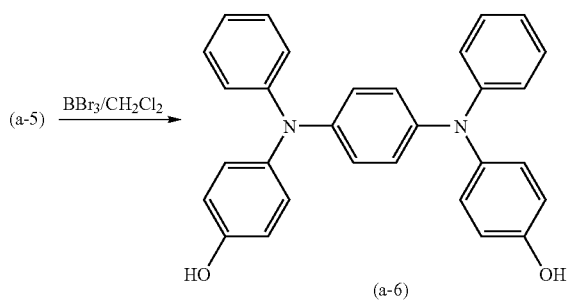

In a nitrogen atmosphere, a solution of 13.75 g {0.029 mol} of the compound (a-5) in 172 ml of dichloromethane was placed in a 500 ml four-necked flask and cooled to −78° C. To the reaction solution was gradually dropwise added a solution of 21.89 g {0.087 mol} of boron tribromide in 115 ml of dichloromethane. After the addition, the mixture was allowed to cool and allowed to react for 8 hours. Then, the reaction solution was diluted with diethyl ether. 1N HCl was added to the solution, and an organic layer was extracted. The thus obtained organic layer was washed with sodium thiosulfate and dried over sodium sulfate, and the solvent was distilled off with an evaporator. The crude product was purified by a silica gel column chromatography method (ethyl acetate:n-hexane=1:4) to give a compound (a-6).

SYNTHESIS EXAMPLE 7

In a 500 ml four-necked flask under a nitrogen gas current, 8.4 g {0.028 mol} of 3,4-dicarboxy-1,2,3,4-tetrahydro-1-naphthalenesuccinic acid dianhydride was dissolved in 69.1 g of NMP. Then, 2.73 g {0.025 mol} of p-phenylenediamine and 1.06 g {0.0028 mol} of 1,3-diamino-4-octadecyloxabenzene were added, and the mixture was allowed to react at room temperature for 10 hours to give a polyamic acid solution.

To 50 g of the above polyamic acid solution, were added 75 g of NMP, 8.3 g of pyridine and 18 g of anhydrous acetic acid as an imidation catalyst, followed by a reaction at 50° C. for 3 hours, to give a polyimide resin solution. The solution was poured into 800 ml of methanol, and the resultant white precipitate was recovered by filtration, washed and dried to give a powder of a polyimide (e). The polyimide (e) was measured by a GPC method to show a number average molecular weight and a weight average molecular weight of {Mn=15000 and Mw=50000}.

SYNTHESIS EXAMPLE 8

In a 500 ml four-necked flask under a nitrogen gas current, 8.4 g {0.028 mol} of 3,4-dicarboxy-1,2,3,4-tetrahydro-1-naphthalenesuccinic acid dianhydride was dissolved in 78.4 g of NMP. Then, 2.43 g {0.022 mol} of p-phenylenediamine, 1.06 g {0.0028 mol} of 1,3-diamino-4-octadecyloxybenzene and 1.95 g {0.0028 mol} of the compound (a-4) were added, and the mixture was allowed to react at room temperature for 10 hours, to give a polyamic acid solution.

To 50 g of the above polyamic acid solution, were added 75 g of NMP, 8.3 g of pyridine and 18 g of anhydrous acetic acid as an imidation catalyst, followed by a reaction at 50° C. for 3 hours, to give a polyimide resin solution. The solution was poured into 800 ml of methanol, and the resultant white precipitate was recovered by filtration, washed and dried to give a powder of a polyimide (c-2). The polyimide (c-2) was measured by a GPC method to show a number average molecular weight and a weight average molecular weight of {Mn=15000 and Mw=50000}.

SYNTHESIS EXAMPLE 9

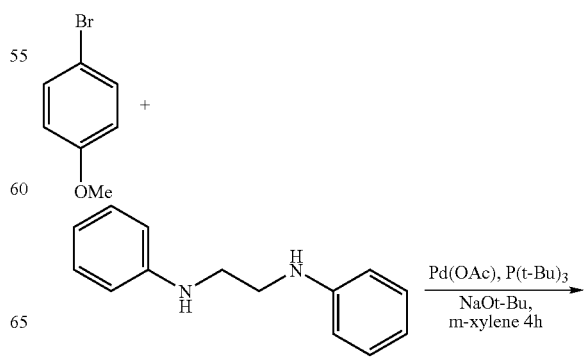

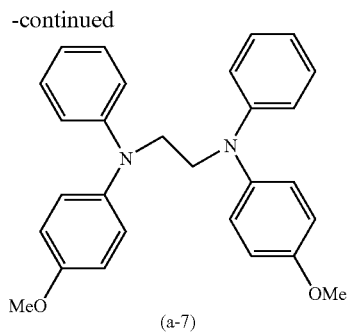

(a-7)

In a nitrogen atmosphere, a 500 ml four-necked flask was charged with 30 ml of m-xylene, 0.56 g {0.0025 mol} of palladium (II) acetate and 2.02 g {0.01 mol} of tert-butyl phosphine, and the mixture was stirred for 10 minutes. Then, a solution of 20.57 g {0.11 mol} of 4-bromoanisole in 20 ml of m-xylene was dropwise added, and the mixture was stirred further for 10 minutes. Then, a solution of 10.61 g {0.05 mol} of N,N'-diphenylethylenediamine in 180 ml of m-xylene was added, then, 14.42 g (0.15 mol) of sodium-tert-butoxide was added, and the mixture was allowed to react at 130° C. for 4 hours. After completion of the reaction, the reaction solution was filtrated, and the filtrate was dissolved in toluene. Activated clay was added thereto. The mixture was stirred at 70° C. for 1 hour, and the reaction solution was filtered. The solvent was distilled off from the filtrate with an evaporator, to give a compound (a-7).

(a-7) $\xrightarrow{\text{BBr}_3/\text{CH}_2\text{Cl}_2}$

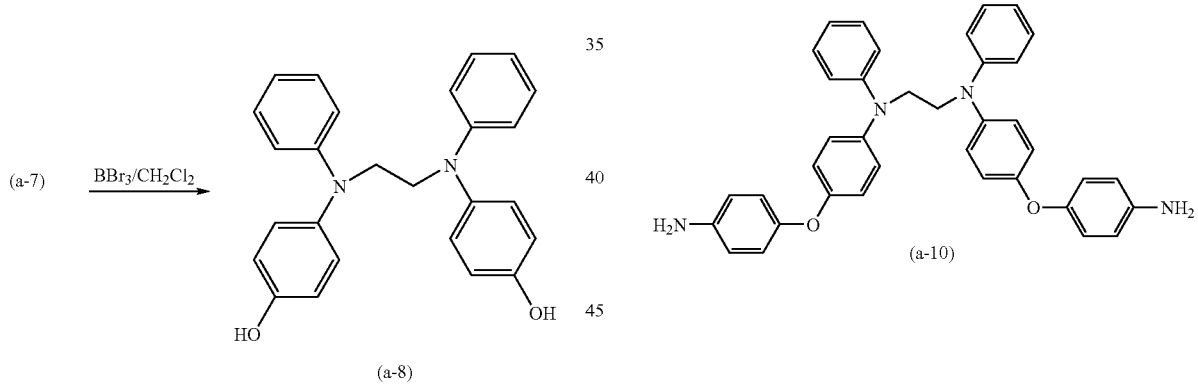

(a-8)

In a nitrogen atmosphere, a solution of 9.81 g {0.0231 mol} of the compound (a-7) in 231 ml of dichloromethane was placed in a 500 ml four-necked flask and cooled to 0° C. To the reaction solution, was gradually dropwise added a solution of 57.8 ml {0.0578 mol} of boron tribromide in 58 ml of dichloromethane. After the addition, the mixture was allowed to react at 0° C. for 16 hours, then, 1N HCl was added, and the mixture was stirred for 30 minutes. The reaction mixture was filtered, and a recovered product was subjected to desalting, to give a compound (a-8).

(a-8) + 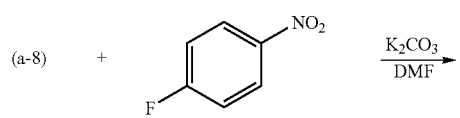 $\xrightarrow{\text{K}_2\text{CO}_3}{\text{DMF}}$

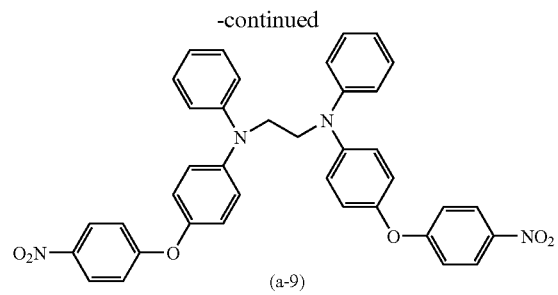

(a-9)

In a 200 ml four-necked flask in a nitrogen atmosphere, 9.912 g {0.025 mol} of the compound (a-8) was dissolved in 120 ml of DMF. To the reaction solution, were added 5.79 ml {0.055 mol} of 4-fluoronitrobenzene, 7.602 g {0.055 mol} of potassium carbonate and 46.5 ml of DMF, and the mixture was allowed to react at 130° C. for 3 hours. Then, 777 ml of water was added, and the mixture was stirred for 1 hour. The reaction solution was centrifugally separated, and the resultant precipitate was washed with methanol four times and filtered. The thus-obtained filtration product was purified by a silica gel column chromatography method (chloroform:n-hexane=2:1) to give a compound (a-9).

(a-9) $\xrightarrow[\text{Pd}-\text{C/H}_2]{\text{Dioxane, AcoH}}$

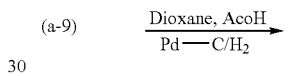

(a-10)

In a 500 ml four-necked flask, 5.11 g (0.008 mol) of the compound (a-9) was dissolved in 36 ml of 1,4-dioxane, and then a solution of 5.25 ml of acetic acid in 2.63 ml of water was added. Palladium-carbon (5% [Pd/C]) (0.00016 mol) was added to the reaction solution to substitute hydrogen, followed by a reaction at 50° C. for 5 days. After completion of the reaction, the palladium-carbon was separated by filtration and the solvent was distilled off. The resultant residue was dissolved in toluene, activated clay was added, and the reaction solution was refluxed for 1 hour. The reaction solution was filtrated, and the solvent was distilled off, to give a compound (a-10).

SYNTHESIS EXAMPLE 10

In a 500 ml four-necked flask under a nitrogen gas current, 5 g (0.025 mol) of DDE and 1.62 g {0.0028 mol} of the compound (a-10) were dissolved in 67.7 g of NMP, and then 5.33 g {0.0272 mol} of CBDA was added, followed by polymerization for 5 hours, to give a solution of a polyamic acid (c-3). The polyamic acid (c-3) was measured by a GPC method to show a number average molecular weight and a weight average molecular weight of {Mn=15000 and Mw=35000}.

EXAMPLE 1

The solution of the polyamic acid (d) obtained in Synthesis Example 5 was diluted with NMP so as to have a resin concentration of 4% by weight. The compound (a-1) obtained in Synthesis Example 1 was added to the solution, and the mixture was stirred for 24 hours, to give a liquid crystal alignment treating agent of the present invention. The amount of the compound (a-1) based on the resin content of the polyamic acid (d) was 15% by weight.

Preparation of Liquid Crystal Cell

The above liquid crystal alignment treating agent was spin-coated on substrates having ITO electrodes (1st: 300 rpm [5 sec], 2nd: 3000 rpm [20 sec]), and the formed coatings were dried at 80° C. for 5 minutes and then baked at 200° C. for 60 minutes. Each coating surface was rubbed for alignment with a rubbing apparatus to form liquid crystal alignment films. Spacers of 6 μm were sprayed on the surfaces of the liquid crystal alignment films, and the substrates were combined such that the rubbing directions cross each other at right angles, to obtain a twisted nematic (TN) cell having a gap of 6 μm. A liquid crystal (MLC-2003, manufactured by Merck Co.) was injected into the cell, and the injection port was sealed to form a liquid crystal cell.

Evaluation of Voltage Retention Ratio and Accumulated Charge

The liquid crystal cell was measured for a voltage retention ratio with a voltage of ±5 V at a pulse width of 64 μs at a frequency of 64 Hz at 23° C. or 90° C.

Concerning the accumulated charge, rectangular waves of 30 Hz/±3 V having a direct current of 3 V superimposed thereon were applied to the cell at 23° C. for 60 minutes, and immediately after the direct current of 3V was cut off, an accumulated voltage remaining in the liquid crystal cell was measured by an optical flicker elimination method. As a result, the liquid crystal cell showed a voltage retention ratio of 98% at 23° C., a voltage retention ratio of 72% at 90° C. and an accumulated charge of 0.1 V.

EXAMPLES 2 to 4

Liquid crystal alignment treating agents were prepared in the same manner as in Example 1 except that the amount of the compound (a-1) was changed respectively to 5% by weight, 25% by weight or 40% by weight, and they were similarly evaluated. The results are shown in the following Table 1.

EXAMPLES 5 to 7

Liquid crystal alignment treating agents were prepared in the same manner as in Example 1 except that the compound (a-1) was replaced by the polymer (b-1) and that the compound (b-1) was added in an amount respectively of 10% by weight, 15% by weight or 25% by weight, and they were similarly evaluated. The results are shown in the following Table 1.

COMPARATIVE EXAMPLE 1

The solution of the polyamic acid (d) obtained in Synthesis Example 5 was diluted with NMP to prepare a liquid crystal alignment treating agent having a resin concentration of 4% by weight. The liquid crystal alignment treating agent was evaluated in the same manner as in Example 1. The results are shown in the following Table 1.

COMPARATIVE EXAMPLE 2

The solution of the polyamic acid (d) obtained in Synthesis Example 5 was diluted with NMP so as to have a resin concentration of 4% by weight. To this solution, was added N,N,N-triphenylamine (to be abbreviated as "TPA" hereinafter), and the mixture was stirred for 24 hours, to obtain a liquid crystal alignment treating agent. The amount of TPA added was 10% by weight based on the resin content of the polyamic acid (d). The liquid crystal alignment treating agent was evaluated in the same manner as in Example 1. The results are shown in the following Table 1.

COMPARATIVE EXAMPLE 3

A liquid crystal alignment treating agent was prepared in the same manner as in Comparative Example 3 except that the amount of TPA was changed to 20% by weight. The liquid crystal alignment treating agent was evaluated in the same manner as in Example 1. The results are shown in the following Table 1.

EXAMPLE 8

The solution of the polyamic acid (c-1) obtained in Synthesis Example 4 was diluted with NMP to prepare a liquid crystal alignment treating agent of the present invention having a resin concentration of 4% by weight. The liquid crystal alignment treating agent was evaluated in the same manner as in Example 1 except that the temperature for baking a formed coating was changed to 230° C. After the liquid crystal cell was evaluated for a voltage retention ratio and an accumulated charge, it was heat-treated at 60° C. for 24 hours and again evaluated for a voltage retention ratio and an accumulated charge. The results are shown in the following Table 2.

COMPARATIVE EXAMPLE 4

The solution of the polyamic acid (d) obtained in Synthesis Example 5 was diluted with NMP to prepare a liquid crystal alignment treating agent having a resin concentration of 4% by weight. The liquid crystal alignment treating agent was evaluated in the same manner as in Example 1 except that the temperature for baking a formed coating was changed to 230° C. After the liquid crystal cell was evaluated for a voltage retention ratio and an accumulated charge, it was heat-treated at 60° C. for 24 hours and again evaluated for a voltage retention ratio and an accumulated charge. The results are shown in the following Table 2.

TABLE 1

| | Polymer | Compound [a] type | Compound [a] amount | Polymer [b] type | Polymer [b] amount | Other compound type | Other compound amount | Voltage retention ratio 23° C. | Voltage retention ratio 90° C. | Accumulated charge |
|---|---|---|---|---|---|---|---|---|---|---|
| Ex. 1 | d | a-1 | 15 | — | — | | | 98% | 72% | 0.1 V |
| Ex. 2 | d | a-1 | 5 | — | — | | | 99% | 68% | 0.7 V |
| Ex. 3 | d | a-1 | 25 | — | — | | | 98% | 54% | 0.1 V |
| Ex. 4 | d | a-1 | 40 | — | — | | | 97% | 39% | 0.1 V |
| Ex. 5 | d | — | — | b-1 | 10 | | | 98% | 90% | 0 V |
| Ex. 6 | d | — | — | b-1 | 15 | | | 98% | 91% | 0 V |
| Ex. 7 | d | — | — | b-1 | 25 | | | 97% | 87% | 0 V |
| Comp. Ex. 1 | d | — | — | — | — | | | 98% | 57% | 1 V |
| Comp. Ex. 2 | d | — | — | — | — | TPA | 10 | 97% | 36% | 1 V |
| Comp. Ex. 3 | d | — | — | — | — | TPA | 20 | 96% | 34% | 1 V |

TABLE 2

| | | Immediately after formation of liquid crystal cell | | | After treatment at 60° C. for 24 hours | | |
|---|---|---|---|---|---|---|---|
| | | Voltage retention ratio | | Accumulated | Voltage retention ratio | | Accumulated |
| | Polymer | 23° C. | 90° C. | charge | 23° C. | 90° C. | charge |
| Ex. 8 | c-1 | 95% | 67% | 0.1 V | 97% | 69% | 0.1 V |
| Comp. Ex. 4 | d | 98% | 63% | 1.5 V | 95% | 30% | 1.4 V |

EXAMPLE 9

The solution of the polyamic acid (c-3) obtained in Synthesis Example 10 was diluted with NMP to prepare a liquid crystal alignment treating agent of the present invention having a resin concentration of 4% by weight. The liquid crystal alignment treating agent was evaluated in the same manner as in Example 1 except that the temperature for baking a formed coating was changed to 230° C. As a result, the thus-obtained liquid crystal cell showed a voltage retention ratio of 98% at 23° C., a voltage retention ratio of 69% at 90° C. and an accumulated charge of 0.3 V.

EXAMPLE 10

The powder of the polyimide (e) obtained in Synthesis Example 7 was dissolved in NMP to prepare a solution having a resin concentration of 4% by weight. To the above solution, was added the compound (a-2) obtained in Synthesis Example 2, and the mixture was stirred for 24 hours to obtain a liquid crystal alignment treating agent of the present invention. The amount of the compound (a-2) based on the resin content of the polyimide (e) was 1% by weight. The liquid crystal alignment treating agent was evaluated in the same manner as in Example 1 except that the temperature for baking a formed coating was changed to 230° C. The results are shown in the following Table 3.

EXAMPLE 11

In Example 10, the compound (a-2) was replaced by the compound (a-1), and the mixture was stirred for 24 hours to obtain a liquid crystal alignment treating agent of the present invention. The amount of the compound (a-1) based on the resin content of the polyimide (e) was 1% by weight. The above liquid crystal alignment treating agent was evaluated in the same manner as in Example 1 except that the temperature for baking a formed coating was changed to 230° C. The results are shown in the following Table 3.

EXAMPLE 12

In Example 10, the compound (a-2) was replaced by the compound (a-6), and the mixture was stirred for 24 hours to obtain a liquid crystal alignment treating agent of the present invention. The amount of the compound (a-6) based on the resin content of the polyimide (e) was 1% by weight. The above liquid crystal alignment treating agent was evaluated in the same manner as in Example 1 except that the temperature for baking a formed coating was changed to 230° C. The results are shown in the following Table 3.

EXAMPLE 13

The powder of the polyimide (c-2) obtained in Synthesis Example 8 was dissolved in NMP to obtain a liquid crystal alignment treating agent of the present invention having a resin concentration of 4% by weight. The above liquid crystal alignment treating agent was evaluated in the same manner as in Example 1 except that the temperature for baking a formed coating was changed to 230° C. The results are shown in the following Table 3.

COMPARATIVE EXAMPLE 5

The powder of the polyimide (e) obtained in Synthesis Example 7 was dissolved in NMP to obtain a liquid crystal alignment treating agent having a resin concentration of 4% by weight. The above liquid crystal alignment treating agent was evaluated in the same manner as in Example 1 except that the temperature for baking a formed coating was changed to 230° C. The results are shown in the following Table 3.

TABLE 3

| | | Compound [a] | | Voltage retention ratio | | Accumulated charge |
|---|---|---|---|---|---|---|
| | Polymer | type | amount | 23° C. | 90° C. | |
| Ex. 10 | e | a-2 | 1 | 99% | 86% | 0.3 V |
| Ex. 11 | e | a-1 | 1 | 99% | 85% | 0.6 V |
| Ex. 12 | e | a-6 | 1 | 99% | 82% | 0.6 V |
| Ex. 13 | c-2 | — | — | 99% | 86% | 0 V |
| Comp. Ex. 5 | e | — | — | 99% | 85% | 1.5 V |

INDUSTRIAL APPLICABILITY

According to the polyimide-containing liquid crystal alignment treating agent of the present invention containing the structure of the formula (I), there can be obtained a liquid crystal alignment film in which the voltage retention ratio is improved or almost no decrease in the ratio is caused and the accumulation charges are decreased, and there can be obtained excellent liquid crystal devices.

The invention claimed is:

1. A liquid crystal display device comprising a liquid crystal alignment film formed from a liquid crystal alignment treating agent,
the liquid crystal alignment treating agent comprising at least one polymer selected from the group consisting of a polyamic acid having the structure of the formula (I) and a polyimide having the structure of the formula (I),

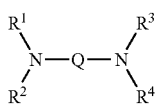

(I)

wherein Q is a single bond or a divalent organic group, and $R^1$ to $R^4$ represent aromatic groups, and $R^1$ to $R^4$ may be the same as, or different from, one another;
and wherein the polyamic acid having the structure of the formula (I) or the polyimide having the structure of the formula (I) is a product obtained by a process which comprises reacting a tetracarboxylic acid dianhydride, a first diamine, and a diamine containing a diamine having the structure of the formula (I).

2. The liquid crystal alignment treating agent according to claim 1, wherein the liquid crystal alignment treating agent is a solution comprising at least one polymer selected from the group consisting of the polyamic acid having the structure of the formula (1) and the polyimide having the structure of the formula (I).

3. A liquid crystal display device comprising a liquid crystal alignment film formed from a liquid crystal alignment treating agent,
the liquid crystal alignment treating agent comprising at least one polymer selected from the group consisting of a polyamic acid and a polyimide;
and a compound having the structure of the formula (I) and/or a polymer having the structure of the formula (I);

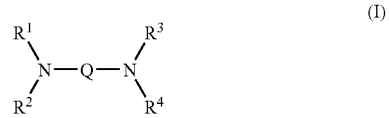

wherein Q for the compound having the structure of the formula (I) is a single bond or a divalent organic group selected from the group consisting of a methylene group, an ethylene group, a propylene group, a —Ph—O—Ph— group, a —Ph—$CH_2$—Ph— group, and a —$CH_2$—Ph—$CH_2$— group, and Q for the polymer having the structure of the formula (I) is a single bond or a divalent organic group, and $R^1$ to $R^4$ represent aromatic groups, and $R^1$ to $R^4$ may be the same as, or different from, one another;
and wherein the polymer having the structure of the formula (I) is selected from the group consisting of
a polyether which is a product obtained by a process which comprises reacting a hydroxyl group-substituted compound having the structure of the formula (I) and a halogen-substituted compound in the presence of an alkali,
a polyamide which is a product obtained by a process which comprises subjecting a carboxy group-substituted compound having the structure of the formula (I) and a diamine derivative to a polycondensation reaction or subjecting an amino-substituted compound having the structure of the formula (I) and a carboxy group-substituted compound to a polycondensation reaction,
a polyamic acid which is a product obtained by a process which comprises subjecting an amine group-substituted compound having the structure of the formula (I) and an acid dianhydride derivative to a polycondensation reaction,
a polyimide which is a product obtained by a process which comprises treating a polyamic acid under heat or in the presence of a dehydration ring closing catalyst, wherein the polyamic acid is obtained by a process comprising subjecting an amine group-substituted compound having the structure of the formula (I) and an acid dianhydride derivative to a polycondensation reaction, and
a polyurethane which is a product obtained by a process which comprises subjecting an isocyanic acid ester-substituted compound having the structure of the formula (I) and a glycol to a polyaddition reaction.

4. The liquid crystal display device according to claim 3, wherein the liquid crystal alignment treating agent is a mixture of the compound having the structure of the formula (I) with a solution comprising at least one polymer selected from the group consisting of the polyamic acid and the polyimide.

5. The liquid crystal display device according to claim 3, wherein the liquid crystal alignment treating agent is a mixture of the polymer having the structure of the formula (I) with a solution comprising at least one polymer selected from the group consisting of the polyamic acid and the polyimide.

6. A liquid crystal display device comprising a liquid crystal alignment film formed from a liquid crystal alignment treating agent, the liquid crystal alignment treating agent comprising at least one polymer selected from the group consisting of a polyamic acid and a polyimide; and
at least one compound selected from the group consisting of compound (1)–(11) having the following formulae:
(1)
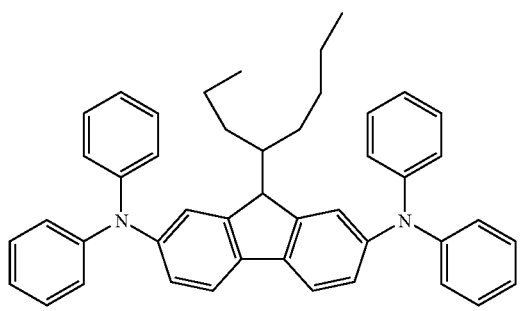
(2)
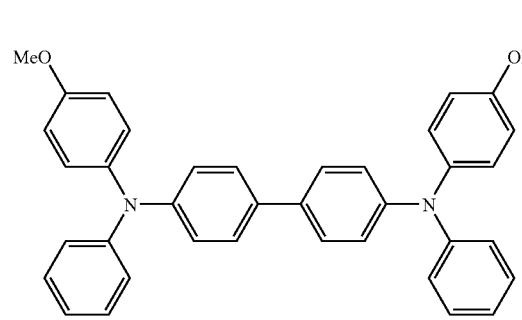
(3)
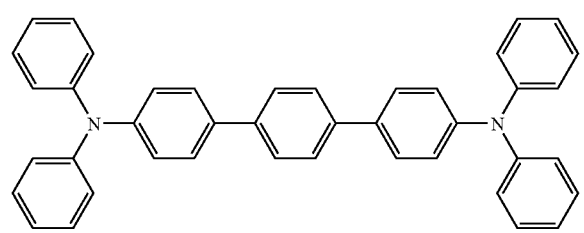
(4)
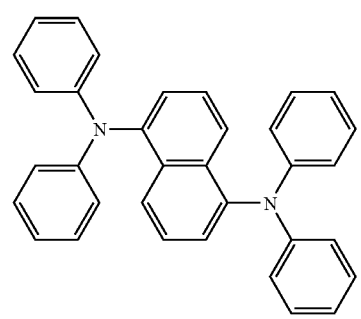
(5)
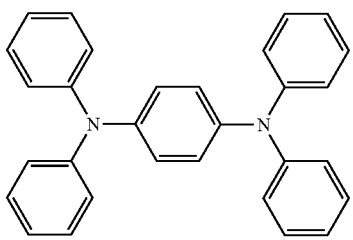
(6)
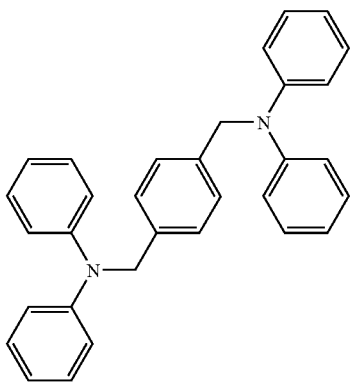
(7)
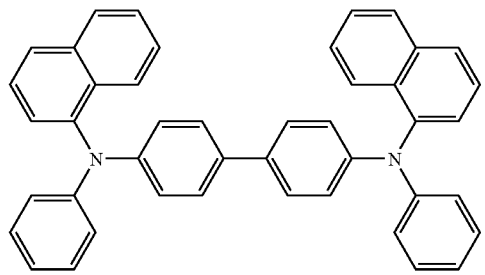
(8)
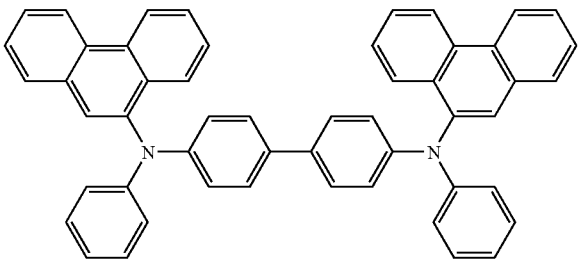

(9)
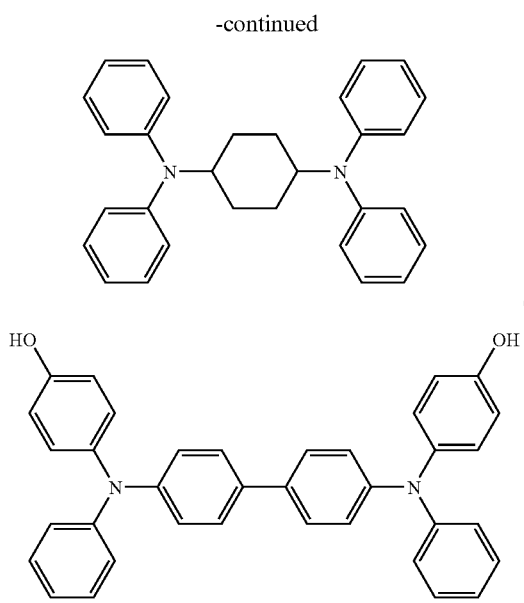
(10)
(11)
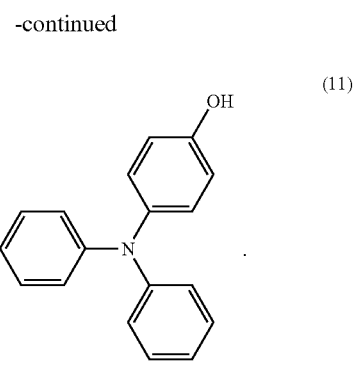
7. The liquid crystal display device according to claim 6, wherein the liquid crystal alignment treating agent is a solution comprising a mixture of the at least one compound and the at least one polymer.
\* \* \* \* \*